(12) United States Patent
Chirifu et al.

(10) Patent No.: US 6,382,709 B1
(45) Date of Patent: May 7, 2002

(54) VEHICLE FRONT PART STRUCTURE

(75) Inventors: Takashi Chirifu; Shirou Yamamuro; Koji Yamada, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/642,624

(22) Filed: Aug. 18, 2000

(30) Foreign Application Priority Data

Aug. 26, 1999 (JP) ............................................ 11-240540

(51) Int. Cl.[7] .............................................. B62D 25/08
(52) U.S. Cl. ........................ 296/189; 276/29; 276/194; 276/203.02
(58) Field of Search ............................ 296/29, 30, 188, 296/189, 193, 194, 203.01, 203.02

(56) References Cited

U.S. PATENT DOCUMENTS

| | | | | |
|---|---|---|---|---|
| 5,106,148 A | * | 4/1992 | Ikeda et al. | 296/194 |
| 5,271,473 A | * | 12/1993 | Ikeda et al. | 180/68.4 |
| 5,397,115 A | * | 3/1995 | Vlahovic | 296/29 |
| 5,466,033 A | * | 11/1995 | Murakami et al. | 296/189 |
| 5,549,352 A | * | 8/1996 | Janotik et al. | 296/209 |
| 5,803,514 A | * | 9/1998 | Shibuya et al. | 293/133 |
| 5,810,426 A | * | 9/1998 | Bovellan | 296/189 |
| 5,829,805 A | * | 11/1998 | Watson | 293/155 |
| 5,913,565 A | * | 6/1999 | Watanabe | 296/189 |
| 6,068,330 A | * | 5/2000 | Kasuga et al. | 296/189 X |
| 6,234,568 B1 | * | 5/2001 | Aoki | 296/203.04 |

FOREIGN PATENT DOCUMENTS

JP    1-34940    6/1985

* cited by examiner

Primary Examiner—Joseph D. Pape
Assistant Examiner—Jason Morrow
(74) Attorney, Agent, or Firm—Merchant & Gould, P.C.

(57) ABSTRACT

A vehicle front part structure includes right and left front side frames provided rightwardly and leftwardly of and extending longitudinally of a vehicle body. A front bumper beam is attached to front ends of the right and left front side frames and extends transversely of the vehicle body. Right and left substays extend downwardly from front parts of the right and left front side frames. The right and left substays have lower parts connected to each other through a front lower cross member. Each of the right and left substays has first portions coupled through fastening members to and has second portions coupled through fillet welding to the respective front parts of the right and left front side frames.

2 Claims, 11 Drawing Sheets

VEHICLE FRONT PART STRUCTURE

BACKGROUND OF THE INVENTION

1. Field of the Invention

The present invention relates generally to a vehicle front part structure, and more particularly to a front bumper beam and its vicinal structure.

2. Description of the Related Art

Known vehicles include front side frames provided rightwardly and leftwardly of front parts thereof. The front side frames extend longitudinally of the vehicles. Front bumper beams extending transversely of the vehicles are attached to front ends of the right and left front side frames. One example of the front parts of the vehicles thus arranged is disclosed in Japanese Utility Model Post-Exam Publication No. HEI-1-34940 entitled "AUTOMOBILE FRONT PART STRUCTURE".

The automobile disclosed in the publication includes upper front frames provided rightwardly and leftwardly of a front part thereof. The right and left upper front frames extend longitudinally of the automobile. Upper and lower branch frames extend forwardly from each upper front frame. The lower branch frame is formed integrally with the upper front frame. The upper branch frame is relatively short and coupled to the upper front frame typically by welding. Attached to front ends of the right and left upper branch frames is a front bumper extending transversely of the automobile. A front cross member extends between front ends of the right and left lower branch frames.

Upon a so-called "offset collision", that is, when a collision impact is applied to that part of the front bumper which is displaced from the center of the automobile toward either the right or left upper branch frame, the impact acts on the upper branch frame, disposed closely to that part, more strongly than on the other upper branch frame disposed remotely from that part.

If the coupling between the upper branch frame and the upper front frame is weakened by the impact, the upper branch frame with the thus-weakened coupling to the upper front frame loses efficiency in absorbing the impact. It is therefore desired of the upper branch frames to remain firmly coupled to the upper front frame even when subjected to the impact.

One may propose with respect to the right and left upper branch frames including right and left stays extending downwardly from front parts thereof that the front cross member extends between the lower ends of the stays. In this case, the right and left upper branch frames should be firmly or stably coupled to the stays so as to absorb the impact with increased efficiency. The upper branch frame coupled to the stays can be made steady by attaching additional members to the upper branch frame. However, the attachment of such additional members undesirably increases the weight of the automobile.

SUMMARY OF THE INVENTION

It is therefore an object of the present invention to provide a vehicle front part structure including right and left front side frames firmly or stably coupled to stays such that the weight of a vehicle does not increase and that, when the vehicle impacts on an object, the impact is absorbed with efficiency.

According to an aspect of the present invention, there is provided a vehicle front part structure comprising: right and left front side frames provided rightwardly and leftwardly of and extending longitudinally of a vehicle body; a front bumper beam attached to front ends of the right and left front side frames and extending transversely of the vehicle body; right and left stays extending downwardly from respective front parts of the right and left front side frames, the right and left stays each having first portions coupled through fastening members to and having second portions coupled through welding to the respective front parts of the right and left front side frames; and a front cross member through which lower parts of the right and left stays are connected to each other.

The stay has the first portions coupled through the fastening members to and has the second portions through the welding to the front part of the front side frame. The couplings between the front side frames and the stays are thus made strong. Even when the vehicle impacts on an object to thereby apply a larger force to one of the right and left front side frames than to the other front side frame, the right and left front side frames both remain firmly or stably coupled to the stays. The front parts of the right and left front side frames are firmly or stably coupled to each other through the right and left stays and the front cross member. The respective front side frames thus arranged buckle upon the impact of the vehicle on the object, thereby absorbing the impact with efficiency.

In a preferred form of the present invention, the right and left stays are coupled at the first portions to the front parts of the right and left front side frames more strongly than at the second portions.

Even when the second portions of the stay coupled through the welding to the front side frame are made unsteady by the impact of the vehicle on the object, the first portions of the stay coupled through the fastening members to the front side frame are kept steady. This means that the front side frame remains stably coupled to the stay.

In a further preferred form of the present invention, each of the right and left front side frames is halved to provide a rear frame and a front frame bolted to a front end of the rear frame, the front frame providing a smaller rigidity than the rear frame when the front bumper beam applies a load to the front frame.

When the vehicle impacts on an object, the impact acts on the front side frame. If the impact acting on the front side frame is small, the front frame alone deforms to thereby absorb the impact. The deformed front frame alone may be replaced. If the impact acting on the front side frame is large, the front and rear frames deform to thereby absorb the impact.

In a still further preferred form of the present invention, the front frame is polygonal in cross-section and is hollowed to define an interior space, the polygon having vertexes connected together through ribs provided within the interior space, the front frame and the ribs being integrally formed by extrusion.

The front frame is hollowed to define the interior space and has a polygonal cross-section. The polygon has the vertexes connected together through the ribs provided within the interior space. The front frame is formed by extrusion to thereby provide a constant thickness throughout the length thereof. The front frame thus arranged buckles uniformly along the length thereof, when the vehicle impacts on the object, to thereby absorb the impact with efficiency.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
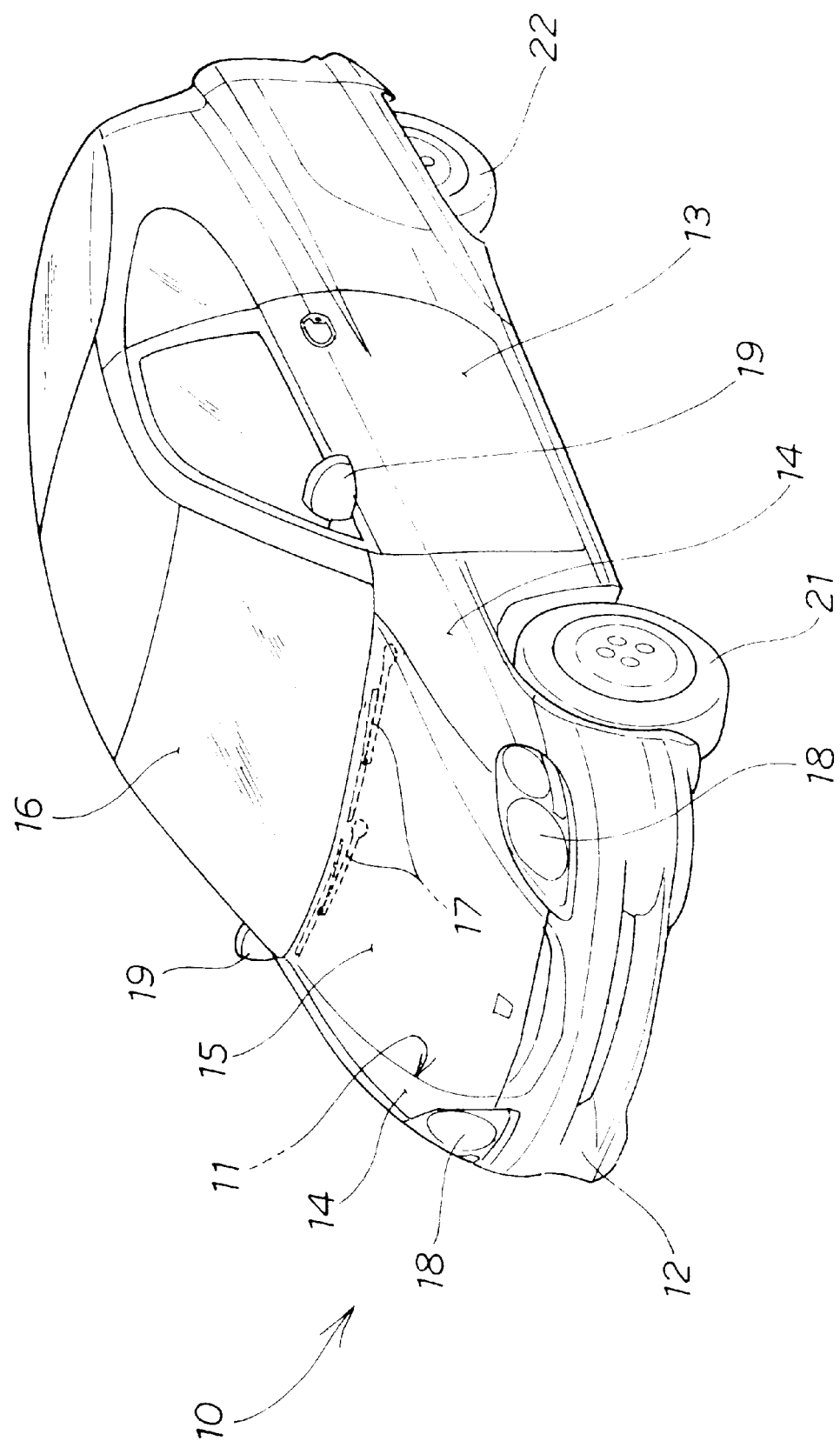
FIG. 1 is a perspective view of an automobile including its front part structured in accordance with the present invention.

Referring to FIG. 1, a two-door automobile 10 includes an engine compartment 11 formed in a front part of a vehicle body, a bumper 12 mounted to a lower portion of the front part of the vehicle body, and right and left doors 13 provided rightwardly and leftwardly of the vehicle body, respectively. Reference numerals 14, 14 denote fenders. Designated by reference numerals 15, 16 are a hood and a windshield, respectively. Reference numerals 17, 17, 18, 18, and 19, 19 are windshield wipers, headlights, and outside mirrors. Reference numerals 21, 22 designate front and rear wheels.

Figure 2:
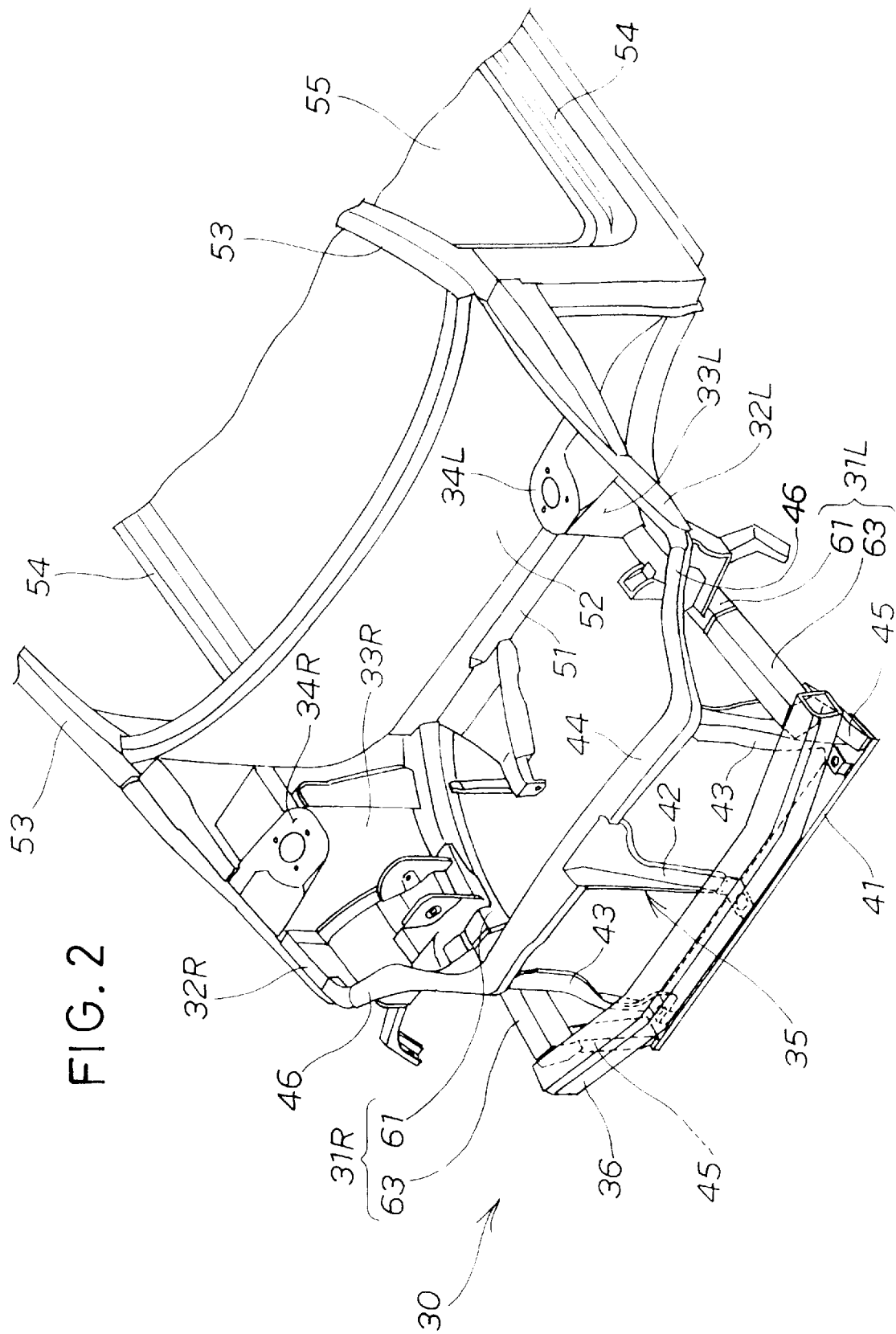
FIG. 2 is a perspective view of the front part of the automobile shown in FIG. 1.

As shown in FIG. 2, the automobile 10 includes a vehicle body frame (the vehicle body) 30 of monocoque structure. The vehicle body frame 30 includes its front part comprising right and left front side frames 31R, 31L provided rightwardly and leftwardly of the vehicle body frame 30. The front side frames 31R, 31L extend longitudinally of the vehicle body frame 30. Right and left upper members 32R, 32L are positioned above and outside the front side frames 31R, 31L and extend longitudinally of the vehicle body frame 30. Between the right front side frame 31R and the right upper member 32R, there are disposed a right wheel house 33R and a right front damper housing 34R. Likewise, between the left front side frame 31L and the left upper member 32L, there are disposed a left wheel house 33L and a left front damper housing 34L. A front bulkhead 35 is coupled to front parts of the front side frames 31R, 31L and front parts of the upper members 32R, 32L. A front bumper beam 36 is attached to front ends of the front side frames 31R, 31L and extends transversely of the vehicle body frame 30. The vehicle body frame 30 is made of aluminum or aluminum alloy.

The front bulkhead 35 includes a front lower cross member 41 disposed below the front parts of the front side frames 31R, 31L and extending transversely of the vehicle body frame 30. A center stay 42 extends upwardly from a widthwise central portion of the front lower cross member 41. Right and left side stays 43, 43 extend upwardly from opposite end portions of the front lower cross member 41. A front upper cross member 44 is coupled to upper ends of the center stay 42 and the side stays 43, 43 and extends transversely of the vehicle body frame 30.

In the respective positions where lower end portions of the side stays 43, 43 are coupled to the front lower cross member 41, there are disposed right and left substays (stays) 45, 45. The front lower cross member 41 serves to support a radiator.

The front upper cross member 44 has right and left extension portions 46, 46 extending backwardly from right and left end portions thereof, respectively. Through such extension portions 46, 46, the front upper cross member 44 is coupled to front ends of the right and left upper members 32R, 32L.

As is apparent from this figure, the right and left substays 45, 45 extend downwardly from the front parts of the right and left front side frames 31R, 31L, and the right and left substays 45, 45 have their lower parts connected to each other through the front lower cross member 41. Reference numerals 51, 52 denote a dashboard lower cross member, and a dashboard, respectively. Designated by reference numerals 53, 53, 54, 54 are front pillars and side sills, respectively. Reference numeral 55 designates a floor panel.

Figure 3:
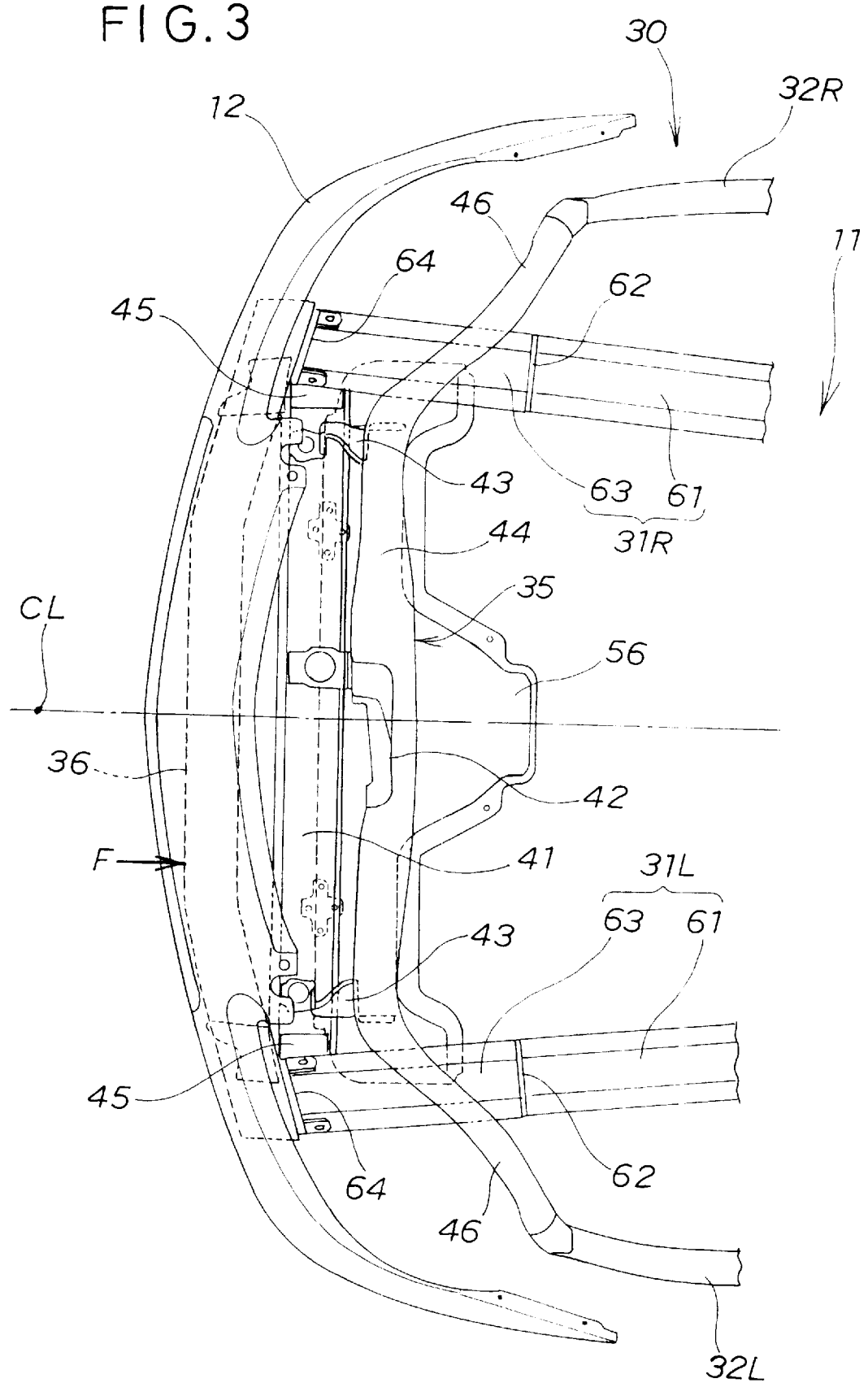
FIG. 3 is a top plan view of the front part of the automobile.

Turning to FIG. 3, the left front side frame 31L is halved to provide a rear frame 61 and a front frame 63 attached to a front end of the rear frame 61. Similarly, the right front side frame 31R is also halved to provide a rear frame 61 and a front frame 63 attached to a front end of the rear frame 61.

The front frame 63 provides a smaller rigidity than the rear frame 61 when the front bumper beam 36 applies a load to the front frame 63, more specifically, when the front bumper beam 36 impacts on an object to thereby apply the load to the front frame 63.

The rigidity of the front frame 63 can be made smaller than that of the rear frame 61 by setting the thickness of the front frame 63 smaller than that of the rear frame 61. The front frame 63 thus arranged buckles more easily than the rear frame 61.

As can be seen from this figure, the front bumper beam 36 provided at the front part of the vehicle body frame 30 is covered with the bumper 12. Disposed below and behind the bumper 12 is an undercover 56 for covering the lower portion of the front part of the vehicle body.

Figure 4:
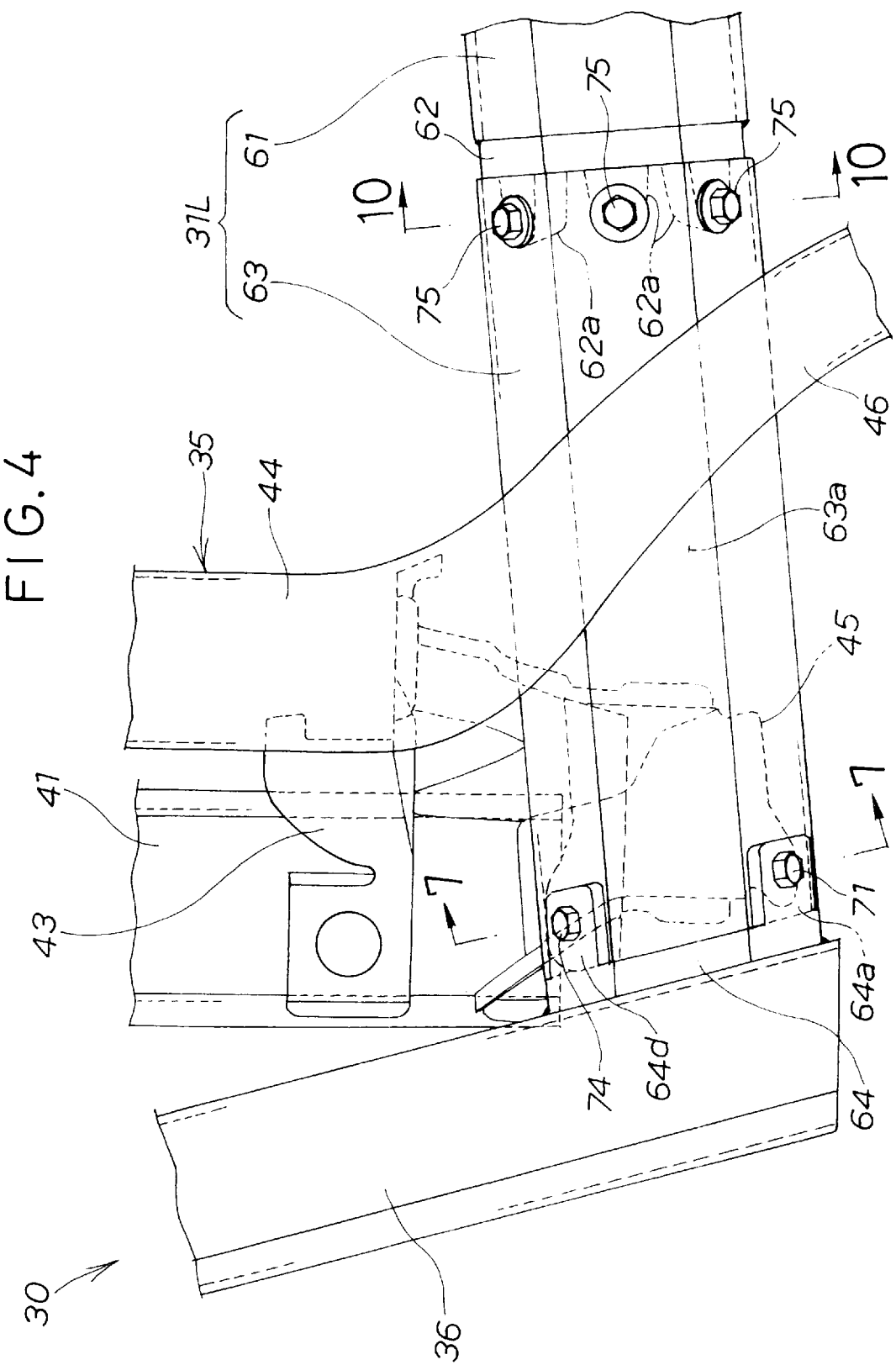
FIG. 4 is a top plan view of a front side frame, a front bulkhead, and a front bumper beam of the front part of the automobile, all of which are coupled together in accordance with the present invention.

Reference is made to FIG. 4. The front end of the rear frame 61 is bolted to a rear end of the front frame 63 through a coupling member 62. The front frame 63 has its front end bolted to an end portion of the front bumper beam 36 through a support 64.

When the vehicle body frame 30 is damaged to such a degree that the front frame 63 alone is deformed, the deformed front frame 63 alone may be replaced, whereby the damaged vehicle body frame 30 can be repaired.

Figure 5:
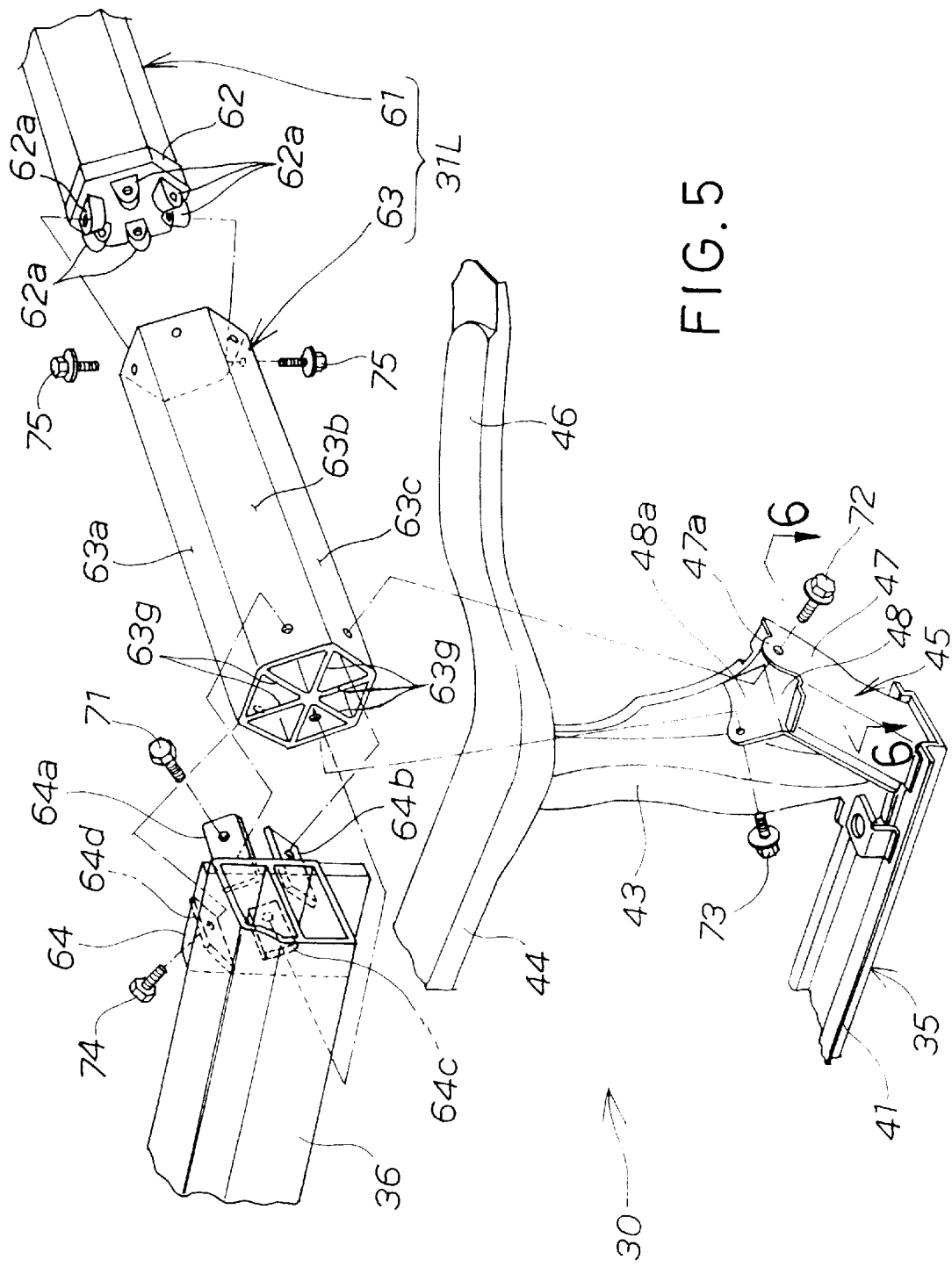
FIG. 5 an exploded perspective view of the front side frame, the front bulkhead, and the front bumper beam, all of which are to be coupled together in accordance with the present invention.

With reference to FIG. 5, welded to the front end of the rear frame 61 is the coupling member 62 to be attached to the front frame 63. The coupling member 62 includes six coupling bosses 62a formed integrally with and projecting forwardly from a front end thereof. The coupling member 62 and the coupling bosses 62a are cast products of aluminum alloy.

The front frame 63 is hexagonal in cross-section and is hollowed to define an interior space. The hexagon has vertexes connected together through ribs 63g provided within the interior space. The front frame may have any polygonal cross-section other than the hexagonal cross-section. Similarly, the polygon has also vertexes connected together through the ribs 63g provided within the interior space. The front frame 63 and the ribs 63g are integrally formed by extrusion.

The extrusion-formed front frame 63 has a constant thickness throughout the length thereof. When the vehicle body frame 30 impacts on an object, the front frame 63 thus arranged buckles uniformly along the length thereof to thereby absorb the impact with increased efficiency. The front frame 63 having the constant thickness is lighter than one having irregularities formed along the length thereof.

The rear frame 61 has the same structure as the front frame 63. The rear frame 61 is formed by extrusion as is the front frame 63.

The front bumper beam 36 is rectangular in cross-section and has a horizontal rib provided therein. The front bumper beam 36 is formed by extrusion. The front bumper beam 36 has the supports 64, 64 (only one shown in this figure) welded to exterior surfaces of opposite end portions thereof. The support 64 comprises four support pieces 64a through 64d extending backwardly from the front bumper beam 36.

The front lower cross member 41 has its left end portion coupled to a lower end portion of the left substay 45 and the left side stay 43. The left substay 45 extends upwardly and outwardly from the front lower cross member 41. The left substay 45 has a pair of coupling pieces 47a, 48a formed at an upper end portion thereof. The coupling pieces 47a, 48a are to be coupled to the front part of the left front side frame 31L.

The left substay 45 forms a part of the front bulkhead 35 having a large rigidity. The front part of the left front side frame 31L is supported by the front bulkhead 35 including the substay 45.

The front bumper beam 36, the rear frame 61, and the front frame 63 are made of extrusion-formed aluminum material, that is, extrusion-formed aluminum and aluminum alloy (Japanese Industrial Standards H 4100). The substay 45 and the support 64 are made of aluminum or aluminum alloy material, that is, press-formed aluminum material.

Figure 6:
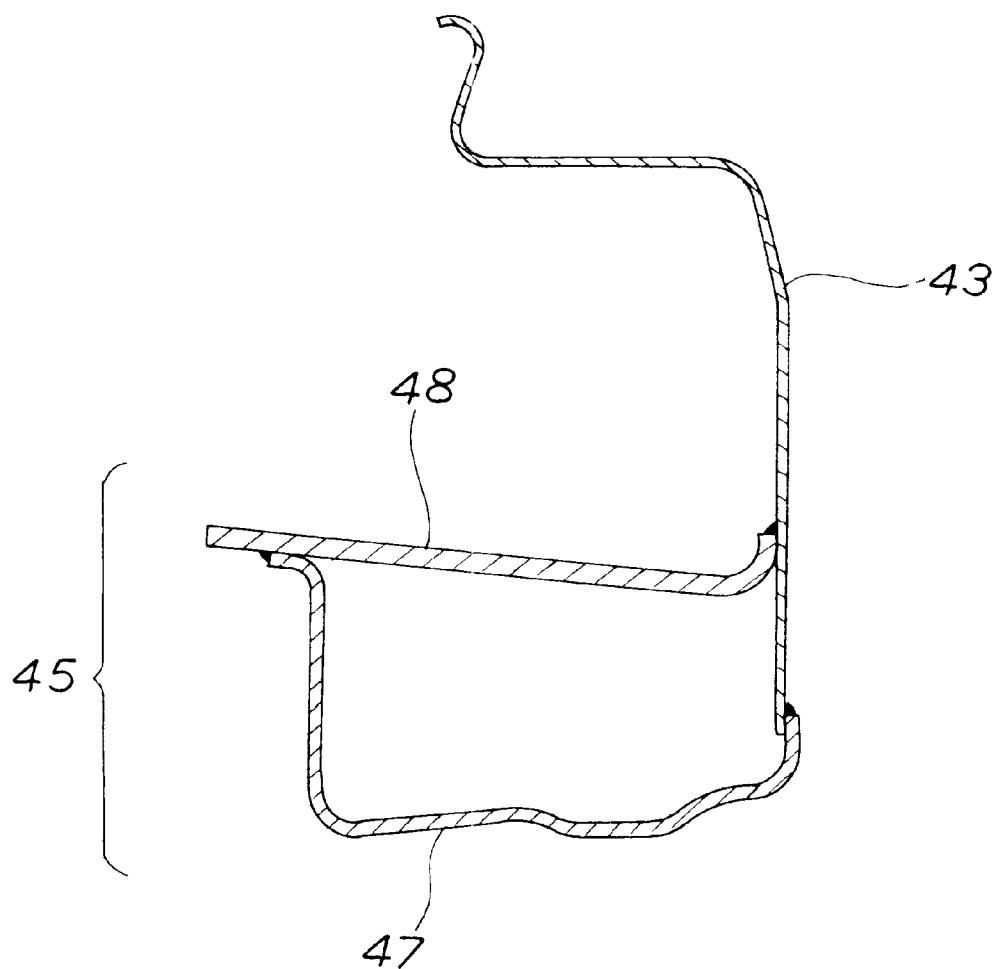
FIG. 6 is a cross-sectional view taken along line 6—6 of FIG. 5.

As shown in FIG. 6, the left substay 45 is hollowed and includes the left side stay 43, a stay portion 47, and a side stiffener 48. The substay 45 thus arranged has a large rigidity. More specifically, the left side stay 43 has an L-shaped configuration and is opened forwardly and leftwardly of the vehicle body frame 30. The stay portion 47 has an L-shaped configuration and is opened rearwardly of the vehicle body frame 30 and towards a center line CL extending through the vehicle body frame 30 as shown in FIG. 3. The side stiffener 48 is made of a sheet member and extends upwardly.

Figure 7:
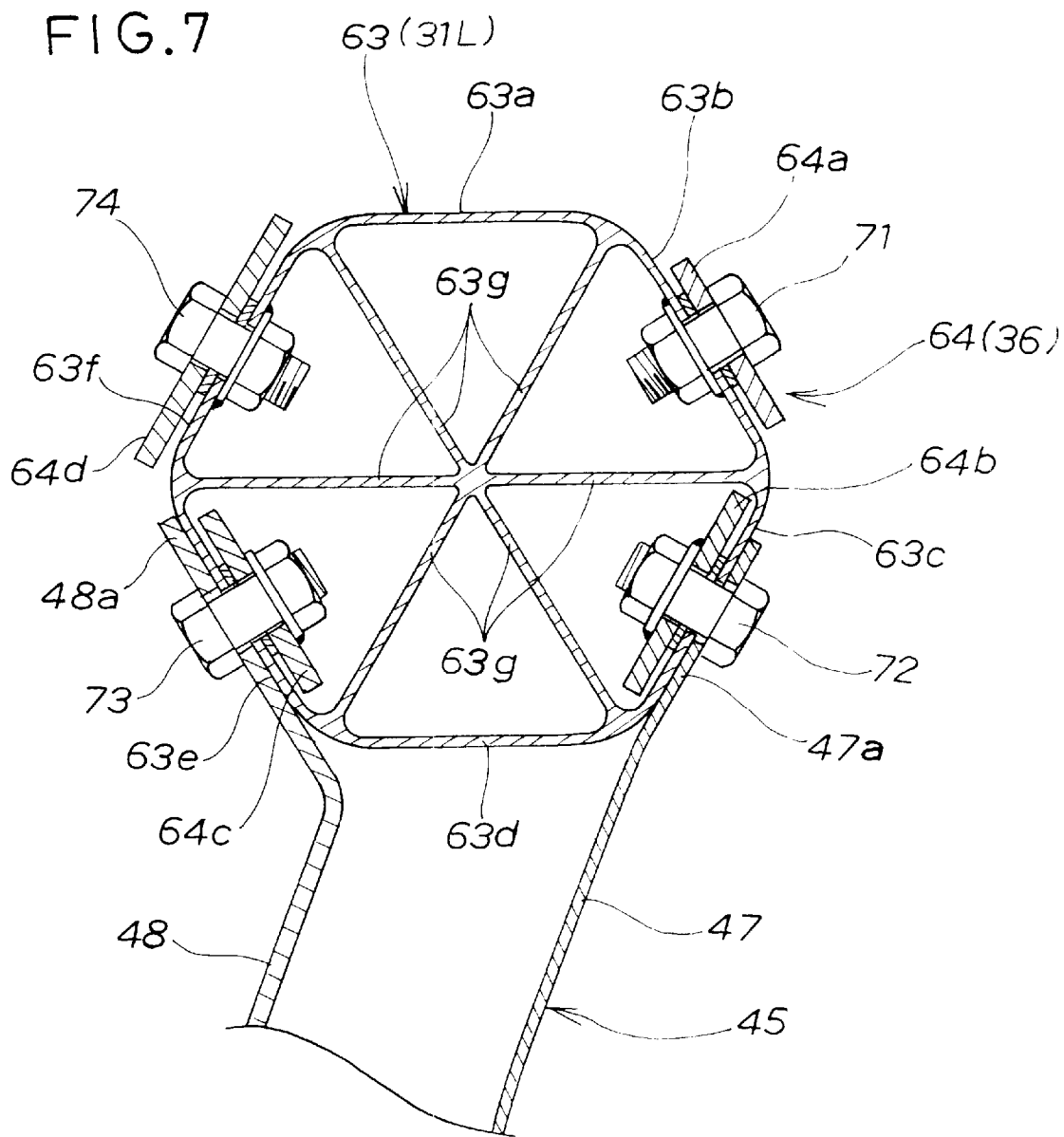
FIG. 7 is a cross-sectional view taken along line 7—7 of FIG. 4.

Turning to FIG. 7, the left front frame 63 of hexagonal cross-section includes a first horizontal side 63a, a second side 63b, a third side 63c, a fourth horizontal side 63d, a fifth side 63e, and a sixth side 63f.

The support pieces 64a, 64b, 64c, 64d are disposed in correspondence to the sides 63b, 63c, 63e, 63f, respectively.

The first support piece 64a is firmly attached to an outer surface of the second side 63b with a bolt and a nut 71.

A bolt and a nut 72 couples the coupling piece 47a of the stay portion 47 to an outer surface of the third side 63c while coupling the second support piece 64b to an inner surface of the third side 63c.

A bolt and a nut 73 couples the coupling piece 48a of the side stiffener 48 to an outer surface of the fifth side 63e while coupling the third support piece 64c to an inner surface of the fifth side 63e.

The fourth support piece 64d is firmly attached to an outer surface of the sixth side 63f with a bolt and a nut 74.

Because the left front frame 63 is sandwiched between the coupling pieces 47a, 48a of the left substay 45, the left front side frame 31L is firmly coupled to the left substay 45.

Figure 8:
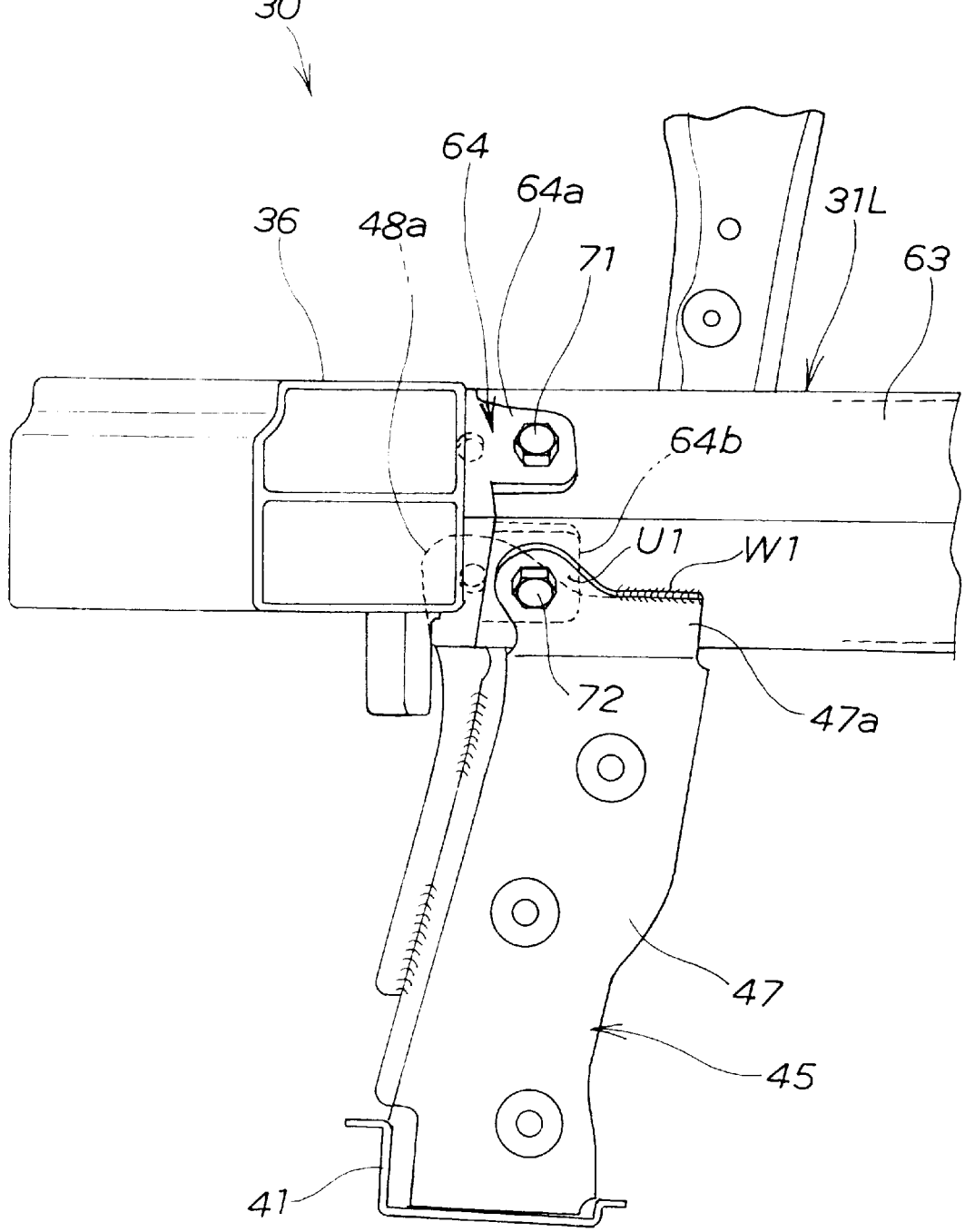
FIG. 8 shows the front bumper beam, a front frame of the front side frames, and a substay of the front bulkhead, all of which are coupled together in accordance with the present invention, as viewed from outside the front side frame.

Referring to FIG. 8, the coupling piece 47a has its upper end portion U1 (a first portion) coupled to the left front frame 63 through the bolt and the nut 72 serving as fastening members. In addition to the upper end portion U1, the coupling piece 47a of the stay portion 47 has a portion W1 (a second portion) coupled through fillet welding to the left front frame 63.

Figure 9:
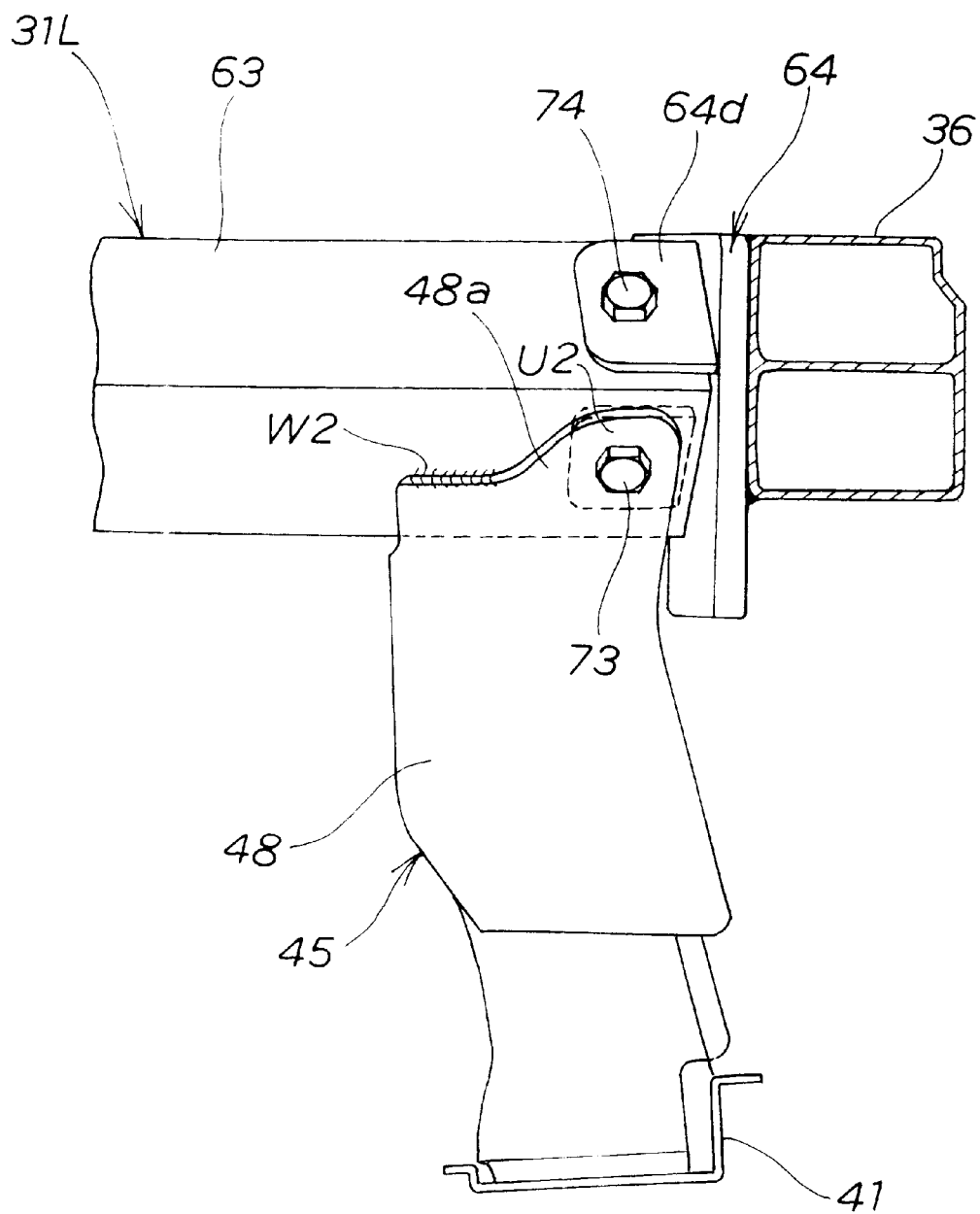
FIG. 9 shows the front bumper beam, the front frame of the front side frame, and the substay of the front bulkhead, all of which are coupled together, as viewed from inside the front side frame.

As shown in FIG. 9, the coupling piece 48a has its upper end portion U2 (a first portion) coupled to the left front frame 63 through the bolt and the nut 73 serving as fastening members. In addition to the upper end portion U2, the coupling piece 48a of the side stiffener 48 has a portion W2 (a second portion) coupled through fillet welding to the left front frame 63.

As described with reference to FIGS. 8 and 9, it will be appreciated that the left substay 45 includes the coupling pieces 47a, 48a having the upper end portions U1, U2 coupled through the bolts and the nuts 72, 73 to and having the portions W1, W2 through the welding to the left front frame 63 of the left front side frame 31L.

With this arrangement, the left substay 45 can be strongly or firmly coupled to the left front side frame 31L. Such a strong coupling can be effected without increasing the cost and weight of the vehicle body.

Especially when the portions W1, W2 of the substay 45 made of aluminum are coupled to the aluminum front frame 63 by MIG welding, weld beads formed at the portions W1, W2 provide increased rigidity thereof.

The coupling pieces 47a, 48a of the left substay 45 are coupled at the upper end portions U1, U2 to the left front frame 63 of the left front side frame 31L more strongly than at the portions W1, W2. This can be done by, for example, employing bolts of diameter and material suitable for providing such a stronger coupling. Even when the vehicle body frame 30 impacts on an object and thereby the coupling between the portions W1, W2 and the front frame 63 is made weak, the upper end portions of the coupling pieces 47a, 48a remain stably or firmly coupled to the front frame 63 through the bolts and nuts 72, 73. This means that the left front side frame 31L remains stably coupled to the substay 45. The left front side frame 31L thus arranged buckles, when the vehicle body frame 30 impacts on the object, to thereby absorb the impact with increased efficiency.

Figure 10:
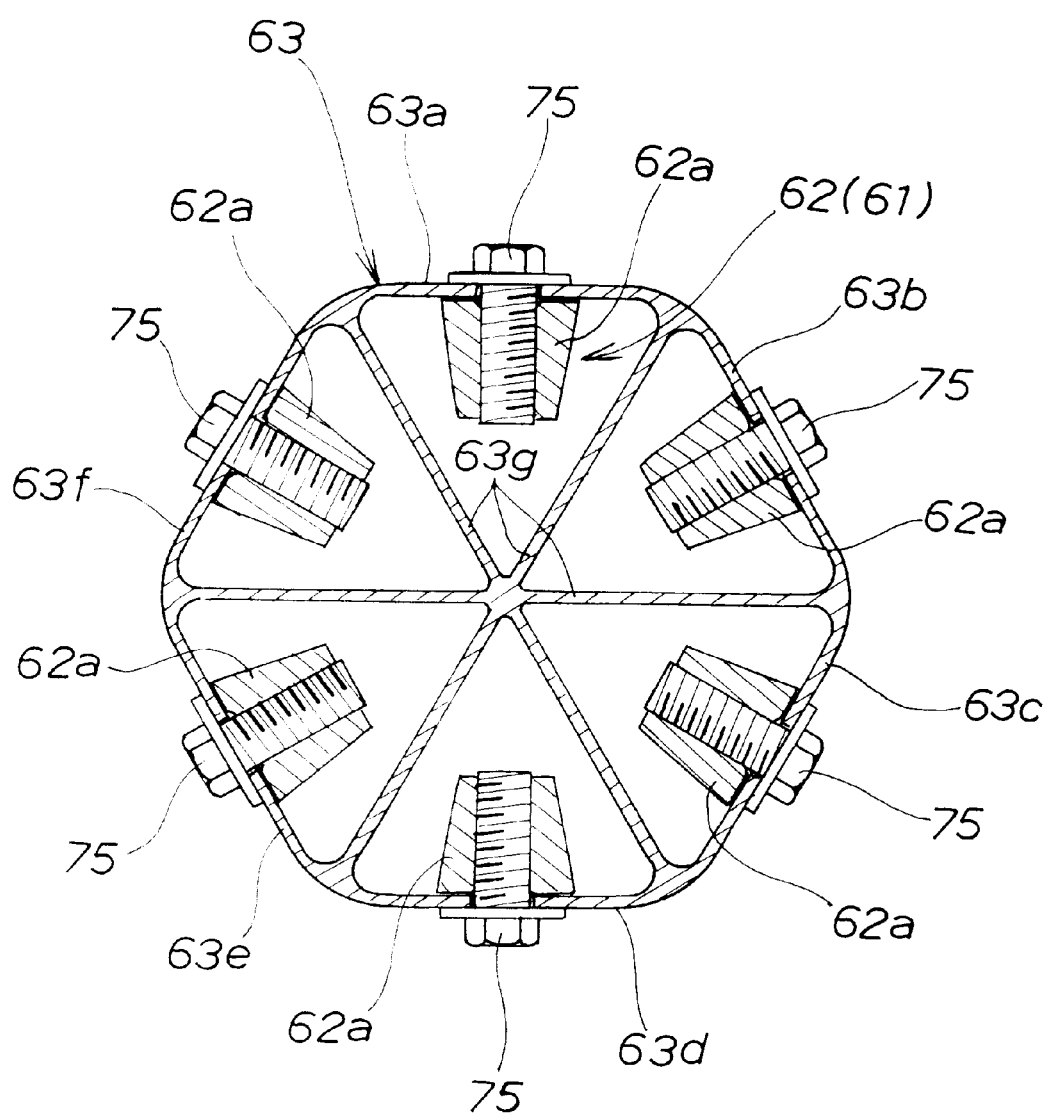
FIG. 10 is a cross-sectional view taken along line 10—10 of FIG. 4.

With reference to FIG. 10, the six coupling bosses 62a of the coupling member 62 are attached to the inner surfaces of the sides 63a through 63f of the left front frame 63 by means of bolts 75. With this arrangement, the left rear frame 61 is firmly attached to the left front frame 63 by means of the coupling member 62 and the bolts 75.

Discussion is made as to how the front side frame 31L operates upon impact of the automobile 10 on an object B.

Figure 11:
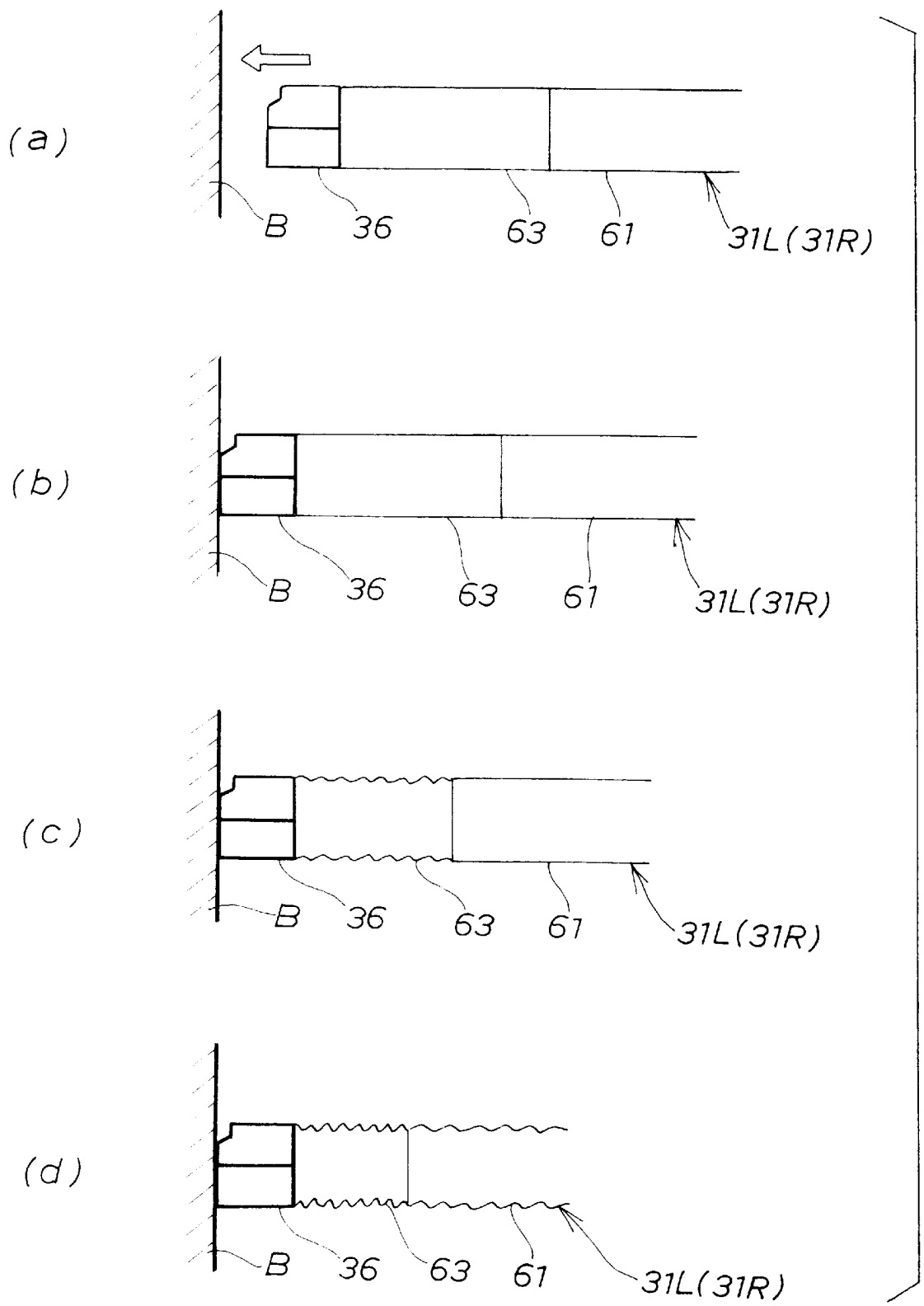
FIGS. 11(a) through (d) show how the front side frame is operated when the automobile impacts on an obstacle.

As shown by an arrow in (a) of FIG. 11, the front bumper beam 36 moves towards an object B.

The front bumper beam 36 then impacts on the object B, as shown in (b) of FIG. 11.

By thus impacting on the object B, the front bumper beam 36 commences to apply a load to the front side frame 31L. Since the front frame 63 provides a smaller rigidity than the rear frame 61 when the front bumper beam 36 applies the load to the front side frame 31L, as previously stated, the front frame 63 first buckles and commences to absorb the impact, as shown in (c) of FIG. 11.

The front bumper beam 36 further applies the load to the front side frame 31L. The front frame 63 further buckles while the rear frame 61 buckles, as shown in (d) of FIG. 11, to thereby greatly absorb the impact.

Referring back to FIG. 3, when a portion of the front bumper beam 36 positioned closely to the left front side frame 31L impacts on an object, such a portion is subjected to a force F produced by the impact. The impact acts on the left front side frame 31L more strongly than on the right front side frame 31R.

Since the right and left front side frames 31R, 31L are coupled to the right and left substays 45, 45 not only through the fastening members but also through the welding, as discussed above, the couplings between the front side frames 31R, 31L and the substays 45, 45 are kept strong. The right front side frame 31R has the front frame 63 stably coupled to the front frame 63 of the left front side frame 31L by means of the right and left substays 45, 45 and the front lower cross member 41. It thus is not likely that the front frames 63, 63 are easily bent.

In other words, the front frames 63, 63 of the right and left front side frames 31R, 31L are supported by the rigid front bulkhead 35 including the right and left substays 45, 45. It is therefore unlikely that the right and left front side frames 31R, 31L are easily bent.

Thus, even when the portion of the front bumper beam 36 positioned closely to either the right or left front side frame impacts on the object, the right and left front side frames 31R, 31L buckle in the manner as described with reference to (a) through (d) of FIG. 11 to thereby absorb the impact with increased efficiency.

The right and left front side frames 31R, 31L are symmetrically disposed. Likewise, the right and left substays 45, 45 are symmetrically disposed, too. The right front side frame 31R and the right substay 45 are identical in construction to the left front side frame 31L and the left substay, respectively. The right front side frame 31R operates in the same manner as the left front side frame 31L. Thus, the description of the right front side frame 31R and the right substay 45 is omitted.

The fastening members are not limited to the bolts 72, 73, but may include rivets. The welding may include not only the fillet welding but also plug welding or the like.

The front lower cross member 41 may be provided separately from the front bulkhead 35.

The front and rear frames 63, 61 may be made from optionally selected materials, and have a variety of configurations and dimensions.

Obviously, various minor changes and modifications of the present invention are possible in the light of the above teaching. It is therefore to be understood that within the scope of the appended claims, the present invention may be practiced otherwise than as specifically described.

What is claimed is:

1. A vehicle front part structure comprising:

right and left front side frames provided rightwardly and leftwardly of and extending longitudinally of a vehicle body, each of said right and left front side frames being halved to provide a rear frame and a front frame bolted to a front end of said rear frame;

a front bumper beam attached to front parts of said right and left front side frames and extending transversely of the vehicle body, said front frame providing a smaller rigidity than said rear frame when said front bumper beam applies a load to said front frame;

right and left stays extending downwardly from respective front parts of said right and left front side frames, said right and left stays each having first portions and second portions, said first and second portions being coupled respectively through fastening members and welding to the respective front parts of said right and left front side frames, said right and left stays being more forwardly and coupled at said first portions to the front parts of said right and left front side frames more strongly than at said second portions; and a front cross member through which lower parts of said right and left stays are connected to each other.

2. A vehicle front part structure comprising:

right and left front side frames provided rightwardly and leftwardly of and extending longitudinally of a vehicle body, each of said right and left front side frames being halved to provide a rear frame and a front frame bolted to a front end of said rear frame, said front frame being polygonal in cross-section and being hollow to define an interior space, the polygon having vertexes connected together through ribs provided within the interior space, said front frame and said ribs being integrally formed by extrusion;

a front bumper beam attached to front parts of said right and left front side frames and extending transversely of the vehicle body, said front frame providing a smaller rigidity than said rear frame when said front bumper beam applies a load to said front frame;

right and left stays extending downwardly from respective front parts of said right and left front side frames, said right and left stays each having first portions and second portions, said first and second portions being coupled respectively through fastening members and welding to the respective front parts of said right and left front side frames, said first portions being more forwardly and coupled to the front parts of said right and left front side frames more strongly than said second portions; and a front cross member through which lower parts of said right and left stays are connected to each other.

* * * * *